Sept. 6, 1949.                K. B. MacDOUGALL                 2,481,319
             ADJUSTING MECHANISM BETWEEN BRAKE SHAFT AND LEVER
Filed Aug. 19, 1947                                    2 Sheets-Sheet 1
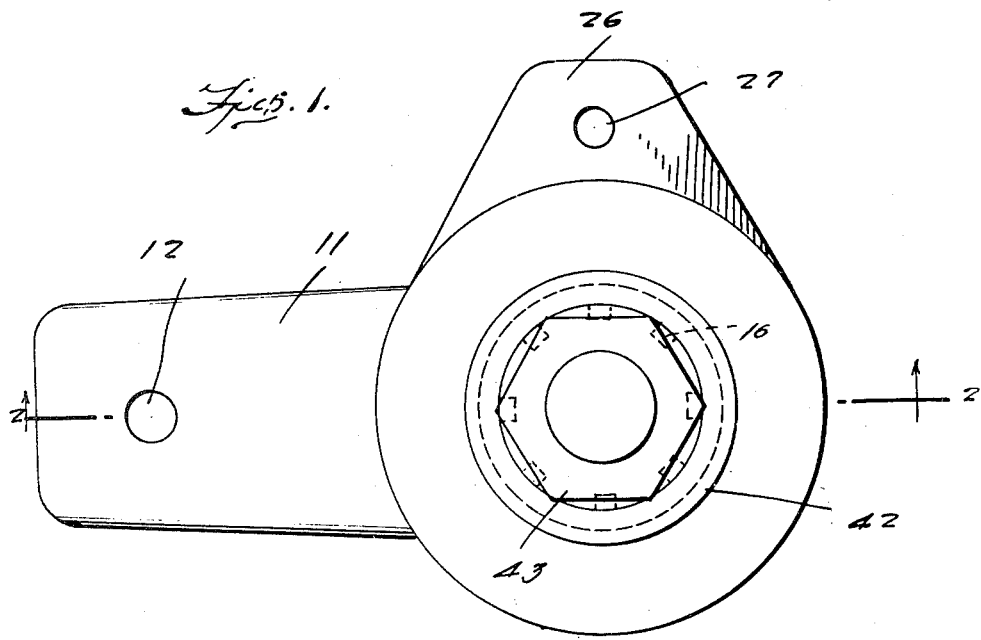
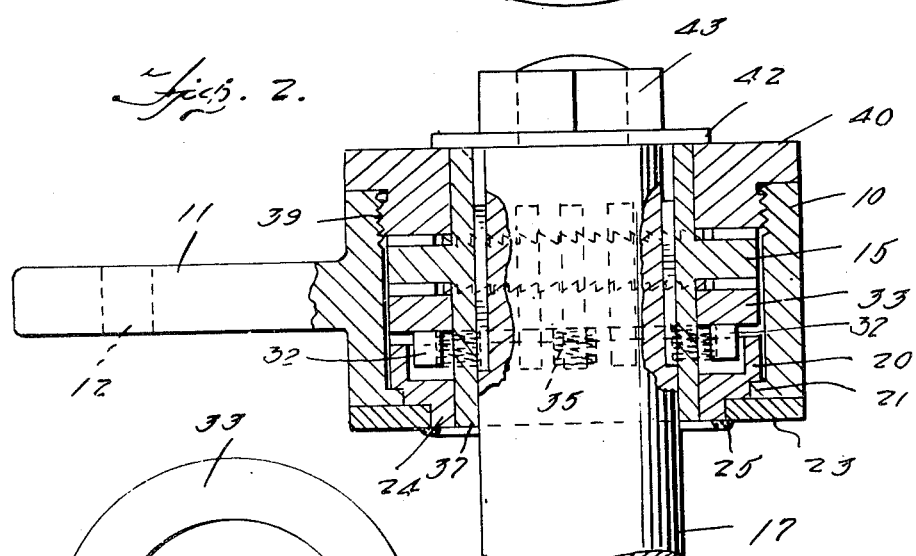
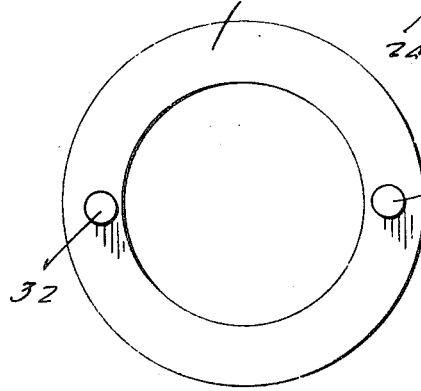
INVENTOR.
Kirkland B. MacDougall
BY
McMorrow, Berman & Davidson
ATTORNEYS Sept. 6, 1949.  K. B. MacDOUGALL  2,481,319
ADJUSTING MECHANISM BETWEEN BRAKE SHAFT AND LEVER
Filed Aug. 19, 1947  2 Sheets-Sheet 2
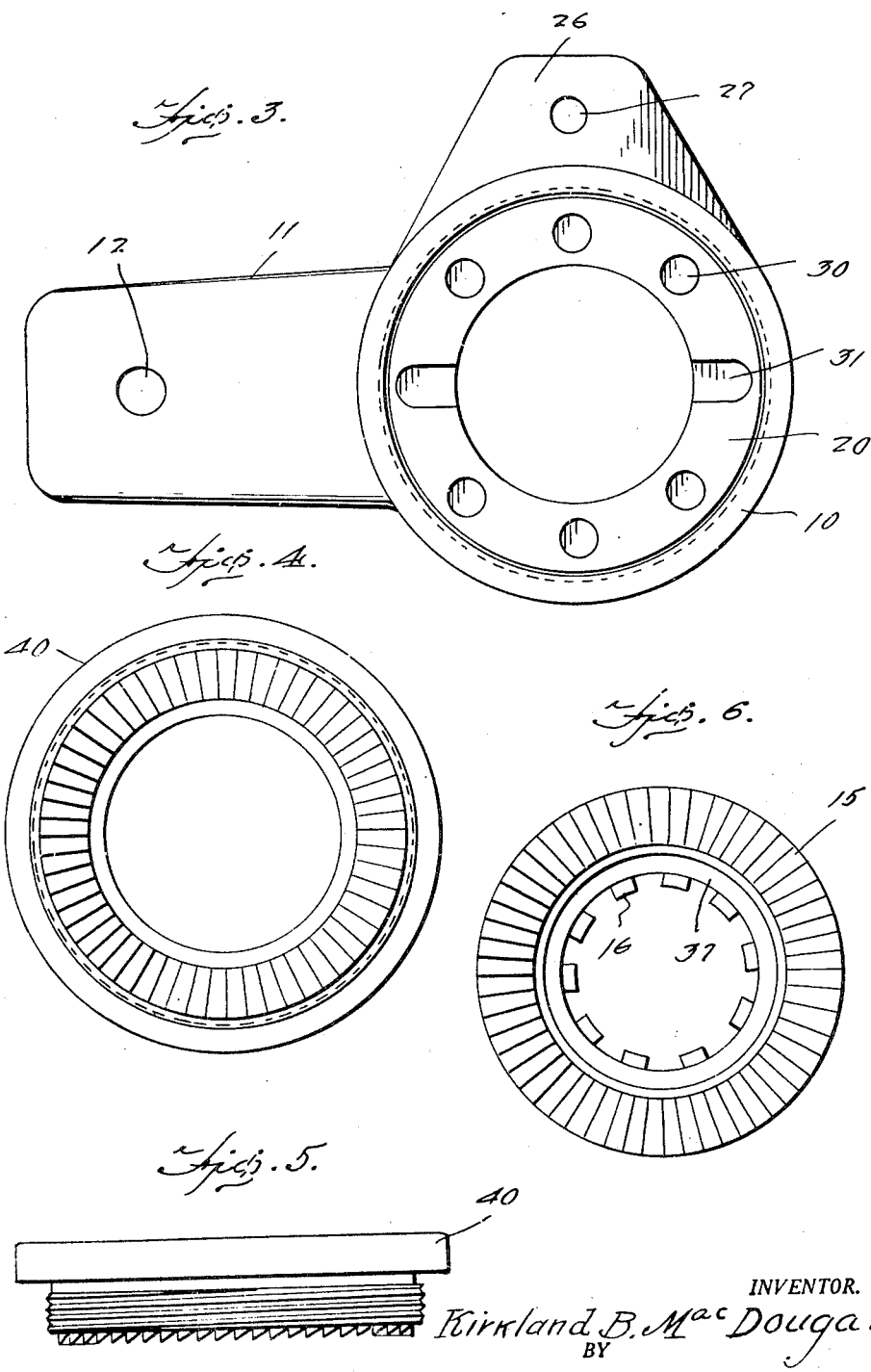
INVENTOR.
Kirkland B. MacDougall
BY
McMorrow, Berman & Davidson
ATTORNEYS

Patented Sept. 6, 1949

2,481,319

UNITED STATES PATENT OFFICE 2,481,319

ADJUSTING MECHANISM BETWEEN BRAKE SHAFT AND LEVER

Kirkland B. MacDougall, Benton, Pa.

Application August 19, 1947, Serial No. 769,393

2 Claims. (Cl. 188—79.5)

This invention relates to motor vehicle brakes, and more particularly to a mechanism for providing adjustment of the brakes automatically as the brake lining wears.

Some of the patents of the prior art have attempted to provide for the automatic adjustment of brake mechanisms, notably the patents to Leon T. Freeman and Roy H. Shively, Patent 2,379,796; Patent 2,385,621; and Patent 2,385,622. Generally, these patents provide a ratchet gear for operating the cam shaft of a brake mechanism. The inherent characteristics of the prior art brake adjustment mechanisms are such that while they operate quite satisfactorily under certain conditions, the unfailing proper operation of the brake mechanism is not positively assured. For instance, in the arrangement and disposition of the ratchet gear and the other component elements that are within the housing of the brake adjustment mechanism, the fact was not taken into consideration that if the ratchet gear became totally disengaged from the other elements with which it cooperates the brakes of the vehicle would be released and, of course, this might result in serious accidents.

In my invention I overcome the possibility of the ratchet gear being totally disconnected from the component elements with which it cooperates and, therefore, the possibility of accidental and unintentional release of the brakes is overcome. The arrangement and disposition of my ratchet gear and other elements with which it cooperates within the casing or housing are such that the ratchet gear cannot possibly be disengaged from the two elements with which it cooperates and the structural features of the said elements are such that the ratchet gear, at any one time or under any conditions, can only be disassociated from one of the elements, but never from both.

In my invention I provide certain mechanism for automatic adjustment of the brakes as the brake lining wears. This mechanism includes a novel form of closure that is applied to one end of a substantially cylindrical hollow casing wherein the component parts of the mechanism are positioned and which closure carries on its inner face, when in position, a plurality of inclined teeth which are adapted to interfit and cooperate with similarly formed teeth on a ratchet gear, the teeth on the ratchet gear being inclined oppositely to the teeth on the inner face of the closure. The mechanism within the hollow casing includes an annular pawl in which coil springs are disposed in recesses and which springs exert their motive force against a gear ring, the latter of which has inclined teeth on a face thereof, which teeth engage similarly formed teeth on another portion of the ratchet gear and which teeth on the ratchet gear are oppositely inclined with respect to the teeth on the gear ring.

When the closure plate carrying the gear teeth is properly removably secured to the casing, sufficient compression has been placed on the springs carried by the pawl and the tolerances between the pawl, the gear ring, the ratchet gear and the teeth on the face of the closure are such that these elements are capable of axial movement to allow them to either clutch and engage each other, or to axially move with respect to one or more of the elements. This axial movement and the engagement of the gear teeth on the gear ring, the rotatable gear and the closure are the means whereby the brakes of the vehicle are automatically adjusted when the brake lining of the braking system has become worn. So long as the brake lining has not become worn the pawl, the gear ring and the ratchet gear will, of course, function when the brakes are operated, but these elements will rotate with respect to each other and not effect a slack take-up of the brake mechanism and will only take up the slack and automatically adjust the brakes when the brake lining, brake bands or brake locks have become worn.

Another aspect of my invention is the fact that I provide a safety feature wherein only one pair of the toothed members will disengage on any occasion and further that it is impossible to free the ratchet gear entirely, for if this ratchet gear were entirely freed, the brakes of the vehicle would be released.

It is a principal object of my invention to improve over the devices set forth in the prior patents.

Another object of my invention is to reduce the number of parts required for this purpose, to not only reduce the cost of operation and manufacture, but to reduce the size of the mechanism and to render the operation safer and more efficient.

Another object of my invention is to provide a device for automatically adjusting the brakes of a vehicle as the brake lining wears and including a novel arrangement of interengaging and cooperating elements, one of which constitutes a closure plate for the casing within which the said elements are disposed.

Another object of my invention is to provide in a device for automatically adjusting the brakes of a vehicle as the brake lining wears, a combined closure and toothed element serving the dual purpose of a closure for one end of the casing within which other toothed elements are disposed, as well as providing the teeth in the closure for cooperation and interengagement with the teeth of one of the elements within the casing.

Another object of my invention is to provide a device for automatically adjusting the brakes of a vehicle as the brake lining wears, which includes a substantially cylindrical hollow casing with an integral extended arm, the said casing containing or having positioned therein the several toothed elements that cooperate with each other and which elements are concentrically disposed about extensions in the form of a sleeve on which a ratchet gear is carried and the peripheral dimensions of all of the elements being substantially the same and fitting closely within the interior walls of the casing, thus providing a very compact, durable and long lasting device which is efficient in its purpose and operaton and requiring little, if any, manual adjustment or maintenance once the device has been installed on the vehicle.

Other objects will appear to those skilled in the art from a reading of the following specification.

The accompanying drawings illustrate a preferred embodiment of the invention, but it is understood that modifications may be made therein without departing from the spirit of the invention as hereinafter claimed.

Figure 1 represents a front elevation of the new and improved brake-adjusting mechanism.

Figure 2 is a horizontal section, taken on the line 2—2 of Figure 1.

Figure 3 is a front elevation of the operating arm of the brake-adjusting mechanism, together with its casing, and showing certain of the component elements removed from the casing and showing the inner side of the pawl and the extension of the bracket.

Figure 4 is a rear elevation of a component known as the closure plate having the teeth integral therewith.

Figure 5 is a side elevational view of the closure plate shown in Figure 4.

Figure 6 is a front elevation of the ratchet gear.

Figure 7 is an elevational view of a component known as a gear ring.

The device comprises a forged steel or other suitable hollow open ended casing 10 having an integral operating arm 11 which extends laterally from the exterior thereof. The operating arm 11 has an aperture 12 by means of which it may be connected to the brake-operating rod of the vehicle. A ratchet gear 15 is positioned within the cylindrical case 10 and is provided with a series of splines 16 by means of which it may engage a complementary splined end of a cam shaft 17 to actuate the brake. The axis of the ratchet gear 15 coincides with that of the shaft 17, and when the brake-operating rod is operated about this axis, the cam shaft 17 will be rotated to actuate the brakes.

Seated within the casing 10 is a circular pawl 20. As seen in Figure 2 of the drawings, the pawl 20 is under cut at its bottom to accommodate an inwardly extending flange 21 at one open end of the casing 10, so that the pawl 20, while free to rotate about the axis of the casing 10 and the ratchet gear 15, cannot move downwardly or outwardly beyond the flange 21. A centrally apertured bracket 23, which includes an extension, later referred to, fits over one end of the casing 10, and over a shoulder 24 of the pawl 20. The pawl 20 and the bracket 23 are welded at 25, the joint being such as to movably and permanently connect the two together as a sub-assembly unit and to allow the pawl 20 and the bracket 23 to move about the axis of the case 10. The connecting of the pawl 20 and the bracket 23 together will prevent axial movement of these members within the casing 10. The bracket 23 is generally circular or ring-like in outline, and has a lateral extension 26 for attachment to the air chamber or other part of the vehicle. If desired, the extension 26 may be provided with a hole 27 for the reception of a bolt which serves to fixedly secure the same to a suitable part of the vehicle.

The upper surface of the pawl 20 is provided with a plurality of spaced apertures 30, for a purpose to be described more particularly hereinafter. The same surface of the pawl 20 is also provided with two diametrically opposed elongated recesses 31. These recesses 31 are designed to receive the diametrically opposed projections 32 which are on the lower face or surface of an annular gear ring 33. The gear ring 33 is positioned between the ratchet gear 15 and the pawl 20. A coil spring 35 is seated in each aperture 30 and the ends of said springs so seated project beyond the upper face or surface of the pawl 20 and exert their motive force so as to press the gear ring 33 against the ratchet gear 15. While six such apertures 30 and springs 35 are shown, it is apparent that a more or less number of apertures and springs may be used as required.

The ratchet gear 15 is integral with or affixed to an internal sleeve 37 the ends of which sleeve projects beyond both toothed surfaces of the ratchet gear 15. The splines 16 extend inwardly from at least a portion of the sleeve 37. The pawl 20 and the gear ring 33 are concentrically disposed on one of the projecting end portions of the sleeve 37, as indicated most clearly in Figure 2 of the drawings. The lower surface of the gear ring 33 is smooth, except for the projections 32, and the upper surface is provided with inclined teeth for engagement with complementary inclined teeth on the under side of the ratchet gear 15 and which last mentioned teeth are inclined oppositely to the teeth on the upper surface of the gear ring 33. These matching interfitting teeth are so arranged that the ratchet gear 15 will grip the gear ring 33 as it turns in one direction, but may slide over the gear ring 33 in the opposite direction due to the opposite inclination of the teeth.

The upper surface of the ratchet gear 15 is provided with another series of inclined teeth, these teeth being oppositely inclined with respect to the teeth on the lower surface of the ratchet gear 15. The other end portion of the case 10 is preferably interiorly threaded at 39. An exteriorly threaded closure plate 40 is adapted to engage the threads 39 of the casing 10 to maintain the ratchet gear 15, the gear ring 33, and the springs 35 in place. A reduced lower surface of the closure plate 40, in contact with the upper surface of the ratchet gear 15, is provided with inclined teeth that are complementary to but oppositely inclinedly disposed with respect to the upper teeth of the ratchet gear 15, which results in gripping in one direction and sliding in the opposite direction when operating arm 11 is moved.

In assembling the device, the pawl 20 is inserted in casing 10 first, and the bracket 23 is welded thereto whereby a subassembly of the two component elements results. Thereafter, the springs 35 are seated in the apertures 30, then the gear ring 33 is positioned so that the projections 32 enter the recesses in the pawl 31, then the ratchet gear 15 is inserted, and then the closure plate 40 is screwed into the case 10 to engage the threads 39 thereof. The whole device is fitted over the cam shaft 17, which engages the splines 16 on the ratchet gear 15, and which is held in place by means of a washer 42 and nut 43.

In the normal operation of the brakes and assuming that there has been no wear of the brake bands and consequently no need for adjustment, the component parts of the brake adjuster are in the positions and relationships as shown in Fig. 2 of the drawing. We will assume now that, with the brake adjuster applied to the vehicle by fixedly mounting the bracket 26 to a suitable portion of the vehicle and that the arm 11 has connected thereto the brake operating rod and the brakes are applied in the normal way, the arm 11, as viewed in Fig. 1, will be moved clockwise and, of course, the casing, the gear ring, ratchet gear splined to the cam shaft, and the ratchet closure plate, all move in unison and the extent of the rotative movement, where no wear of the brake bands has taken place, is, of course, limited as the brakes, under such circumstances, are properly adjusted and there is no relative movement of any of the aforesaid component parts, either in applying or releasing the brakes, as these parts, as aforesaid, move rotatably in unison.

We will assume now that wear of the brake bands has occurred and that the operator, under these circumstances, applies the brakes by actuating the same and consequently rotating arm 11 in a clockwise direction, as seen in Fig. 1 of the drawings. The fact that the brake bands have become worn and, therefore, the necessity of taking up the slack, when the brakes are applied, will allow the arm 11 to travel a greater distance in its rotative movement than in the aforesaid normal operation of the brakes where no wear has occurred and this greater rotative movement of the arm along with the casing, the ratchet closure, the gear ring, the ratchet gear splined to the cam shaft, will result in the engagement of the diametrically disposed projections 32 carried by the gear ring 33 with the side walls of the recesses 31 in the fixed pawl, thus stopping the rotative movement of the gear ring 33 and, as the meshed ratchet gear further rotatably moves, the teeth of the ratchet gear that are in engagement with the teeth of the gear ring will be disengaged by axial movement of gear ring 33 which effects compression of the springs 35 positioned between the pawl and the lower face of the gear ring. Then the ratchet gear, which is splined to the cam shaft, will rotatably move and move the cam shaft with it for at least the distance of one tooth movement and then, by the expansive action of springs 35, the teeth of the ratchet gear will reengage the gear ring and, of course, as the ratchet gear moves, the closure plate with its teeth in engagement with the teeth on the other face of the ratchet gear moves in unison therewith. Now we have been talking about the application or actuation of the brakes to apply the same and the fact that the cam shaft for the actuation of the brakes has been rotatably moved to a new position of adjustment for proper functioning of the brakes.

After the cam shaft has been rotated for at least one notch of the gear teeth on one face of the ratchet gear by disengagement of the teeth on the gear ring and one face of the ratchet gear and setting the brakes in the new position, the brakes, of course, must be released. In the release of the brakes, the arm 11 moves counterclockwise and, in doing so, the teeth on the one face of the ratchet gear are in engagement with the teeth on the gear ring and, at the outset, before actual release of the brakes, the teeth on the other face of the ratchet are in engagement with the teeth on the closure. On this return rotative movement, which is started from an extreme forward position where the brakes are actually adjusted, the arm 11, of course, moves in the reverse direction from the brake applying direction and carries with it the casing and the toothed closure. As the ratchet gear will be held in the new position of adjustment by the teeth on the one face thereof being in engagement with the teeth on the gear ring 33, the arm, casing, and closure plate with its teeth will be moving rotatively the distance of at least one tooth and the teeth on the closure plate will be disengaged from the teeth on the face of the ratchet gear by axial displacement of the housing and the closure plate, this axial movement being permitted by the space between the pawl and the gear ring. The ratchet gear is held stationary so that its teeth will then reengage in the new position, with the teeth on the closure plate by means of the spring 35. It is understood that the brake shoes are spring loaded and consequently there is a force exerted to return the same to a released condition, thus causing the cam shaft to rotate and carry with it the ratchet gear to brake released condition. Thus the brakes and the brake adjuster are again normal.

From the foregoing, it will be clearly seen that the operation of the parts briefly described consists in the normal operation of the brakes and the brake adjuster where no wear of the brake bands has taken place, the teeth on the opposite faces of the ratchet gear are in engagement respectively with the teeth on the closure plate and the teeth on the gear ring and move in unison. Where wear of the brake bands takes place, and the brakes are actuated, the rotative movement of the ratchet gear, which is splined to the cam shaft, moves relatively to the gear ring which becomes fixed when the brakes are actuated and, when the brakes are then released after adjustment has occurred, the teeth carried by the closure plate move relatively with respect to the ratchet gear which is in a fixed position.

The interior dimension of the casing is such with respect to the transverse thickness of the pawl, gear ring, ratchet gear and the teeth on the closure plate, that a limited space is provided between the fixed pawl and the gear ring, such space being of a dimension only slightly greater than the depth of the teeth. Thus it will be seen that the disengagement of but only one pair of teeth at a time can possibly occur.

I claim:

1. In a self-adjusting brake mechanism, a hollow cylindrical casing having open opposite sides, an operating arm carried by the casing, a ratchet gear having teeth on opposite sides thereof positioned within the casing, a sleeve of uniform diameter on which said ratchet gear is fixed between the ends thereof, a closure for one side of the casing having teeth integral therewith, the said closure teeth being disposed interiorly of one end portion of the casing concentrically with respect to the sleeve on one side of the ratchet gear and the teeth thereof being removably engageable with the teeth on one side of the ratchet gear, a gear ring having teeth on one face to removably engage the teeth of the ratchet gear on the other side thereof, a pawl adjacent the gear ring and concentric with the ratchet gear sleeve in the other end portion of the casing and having pawl means for inter-engagement with means on the other face of the gear ring, an integral shoulder on the casing extending into the pawl, a bracket which acts as a closure for the other side of the casing irremovably joined with the pawl on the opposite side of the shoulder, spring means held by the pawl for elastically urging the gear ring against the ratchet gear and the teeth on the closure against the ratchet gear, and there being a space greater than a tooth depth and less than twice the tooth depth of all of the said mentioned teeth between the gear ring and the pawl which will prevent simultaneous disengagement of the ratchet gear teeth from the teeth on the closure and the teeth on the gear ring.

2. In a self-adjusting brake mechanism, a hollow cylindrical casing having open opposite sides, an operating arm carried by the casing, a ratchet gear having teeth on opposite sides thereof positioned within the casing, a sleeve of uniform diameter on which said ratchet gear is fixed between the ends thereof, a closure for one side of the casing having teeth integral therewith, the said closure teeth being disposed interiorly of one end portion of the casing concentrically with respect to the sleeve on one side of the ratchet gear and the teeth thereof being removably engageable with the teeth on one side of the ratchet gear, a gear ring having teeth on one face to removably engage the teeth of the ratchet gear on the other side thereof, a pawl adjacent the gear ring and concentric with the ratchet gear sleeve in the other end portion of the casing and having pawl means for interengagement with means on the other face of the gear ring, a bracket which acts as a closure for the other side of the casing irremovably joined with the pawl, spring means held by the pawl for elastically urging the gear ring against the ratchet gear and the teeth on the closure against the ratchet gear and there being a space greater than a tooth depth and less than twice the tooth depth of all of the said mentioned teeth between the gear ring and the pawl which will prevent simultaneous disengagement of the ratchet gear teeth from the teeth on the closure and the teeth on the gear ring.

KIRKLAND B. MacDOUGALL.

REFERENCES CITED

The following references are of record in the file of this patent:

UNITED STATES PATENTS

| Number | Name | Date |
|---|---|---|
| 1,755,525 | Tatter | Apr. 22, 1930 |
| 2,377,014 | Keller | May 29, 1945 |
| 2,385,621 | Freeman et al. | Sept. 25, 1945 |
| 2,385,622 | Freeman et al. | Sept. 25, 1945 |